(12) United States Patent
Renn et al.

(10) Patent No.: US 8,061,656 B1
(45) Date of Patent: Nov. 22, 2011

(54) HINGE APPARATUS WITH AN ACTUATABLE ASSEMBLY

(75) Inventors: Philip Alan Renn, La Plata, MD (US); J. David De Leon, Bel Alton, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 316 days.

(21) Appl. No.: 12/587,316

(22) Filed: Sep. 22, 2009

(51) Int. Cl.
   *B64C 1/14* (2006.01)
(52) U.S. Cl. .......................... 244/122 AF; 244/122 AE
(58) Field of Classification Search ............ 244/122 AF, 244/122 AE, 121; 89/1.57
   See application file for complete search history.

(56) References Cited

U.S. PATENT DOCUMENTS

| | | | | |
|---|---|---|---|---|
| 2,971,728 A | * | 2/1961 | Martin | 244/121 |
| 3,885,761 A | * | 5/1975 | Pendergast et al. | 244/121 |
| 4,301,707 A | * | 11/1981 | Schimmel et al. | 89/1.14 |
| 4,570,879 A | * | 2/1986 | Dupin | 244/122 AF |
| 4,721,272 A | * | 1/1988 | Nordhaus | 244/122 AF |
| 5,205,516 A | * | 4/1993 | Bright et al. | 244/121 |
| 6,390,413 B1 | | 5/2002 | Chiu | |
| 6,679,453 B2 | | 1/2004 | Steiner | |
| 7,093,799 B1 | | 8/2006 | Dulat et al. | |
| 2002/0135166 A1 | | 9/2002 | Thomas | |
| 2009/0079175 A1 | | 3/2009 | Morita et al. | |

FOREIGN PATENT DOCUMENTS

DE 3513492 A1 * 10/1986

OTHER PUBLICATIONS

U.S. Appl. No. 12/587,318, filed Sep. 22, 2009, Renn.
Bell Helicopter a Textron Company, AH-1 Z Pocket Guide, Mar. 2006, Forth Worth, TX 76101.

* cited by examiner

*Primary Examiner* — Christopher P Ellis
(74) *Attorney, Agent, or Firm* — Fredric J. Zimmerman

(57) ABSTRACT

A hinge apparatus for automated decoupling that includes an actuatable assembly normally coupled, very robust, and suitable for the hanging of a door/canopy and the like. When mounted, the apparatus is normally decoupled where rapid egress is necessary, and complete removal of the door/canopy is desired. The apparatus includes a hinge finger with a finger pin and a reciprocal hinge finger with a hinge gudgeon. The finger pin normally intersects and freely pivots with respect to the gudgeon, such as when the door/canopy is opened or closed. The actuatable assembly employs a SMDC tip device to actuate a piston that decouples the hinge. Decoupling is effected as the piston linearly shifts moving the hinge finger such that the finger pin no longer intersects the gudgeon and the door/canopy falls away.

20 Claims, 7 Drawing Sheets

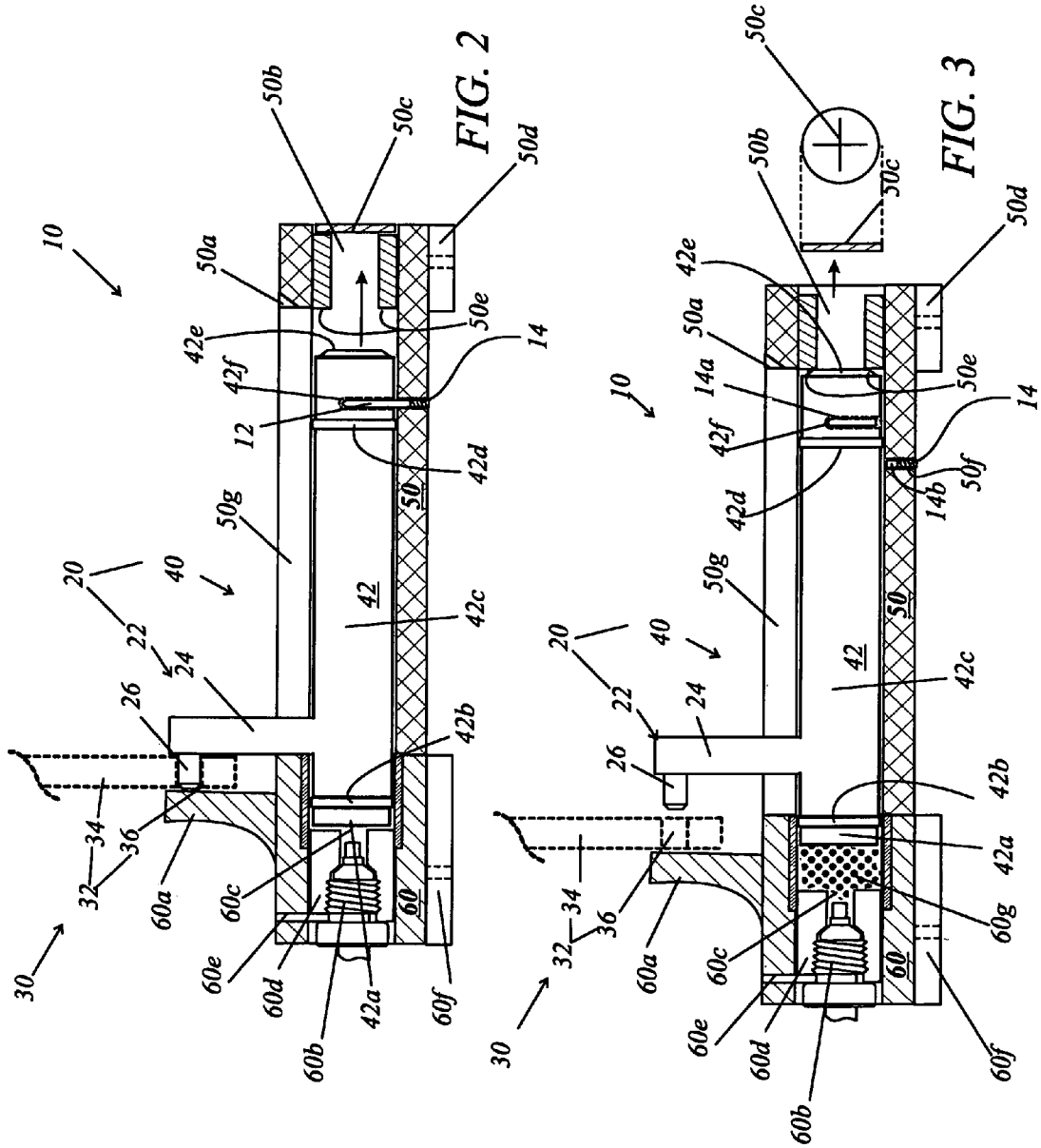

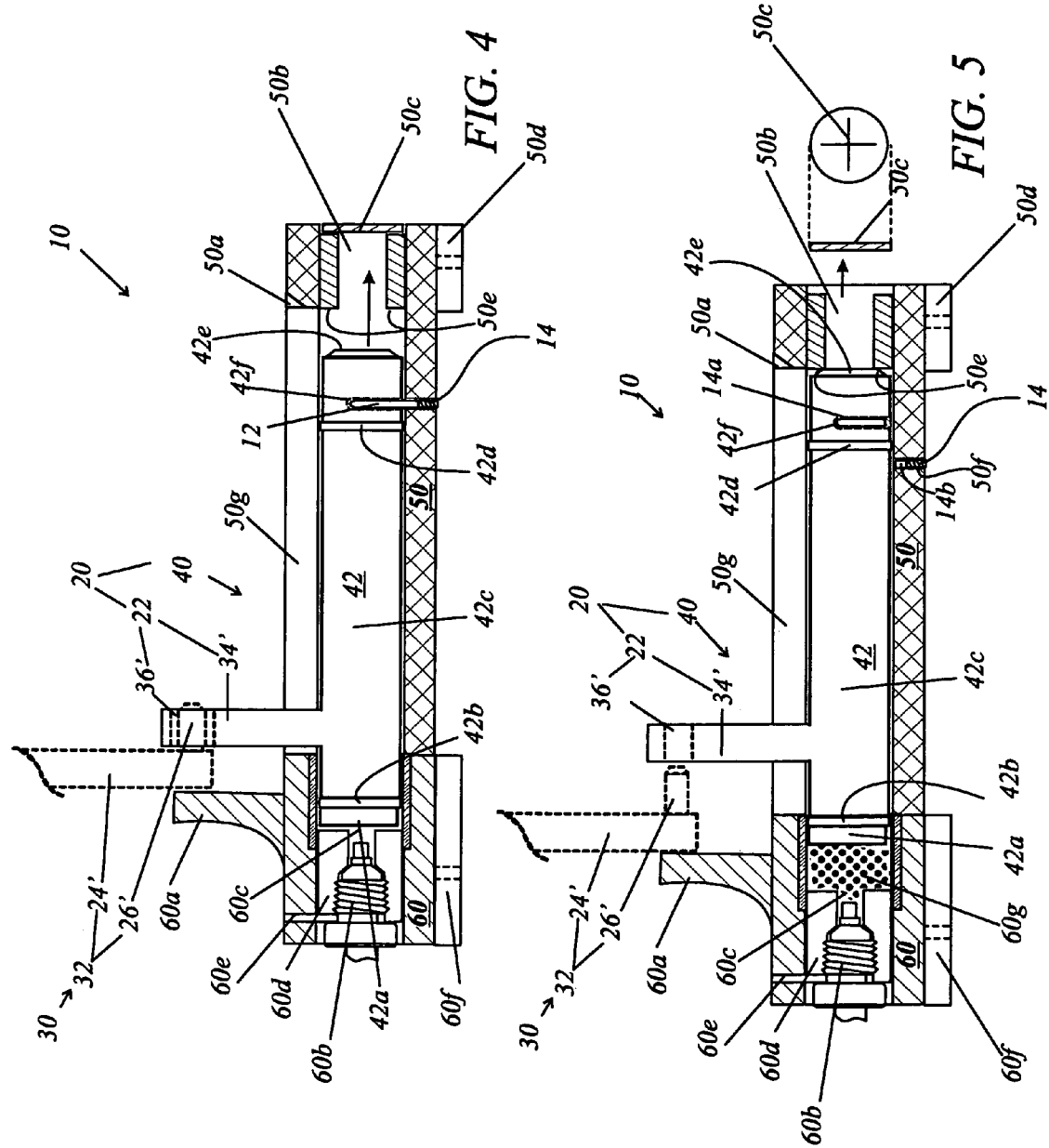

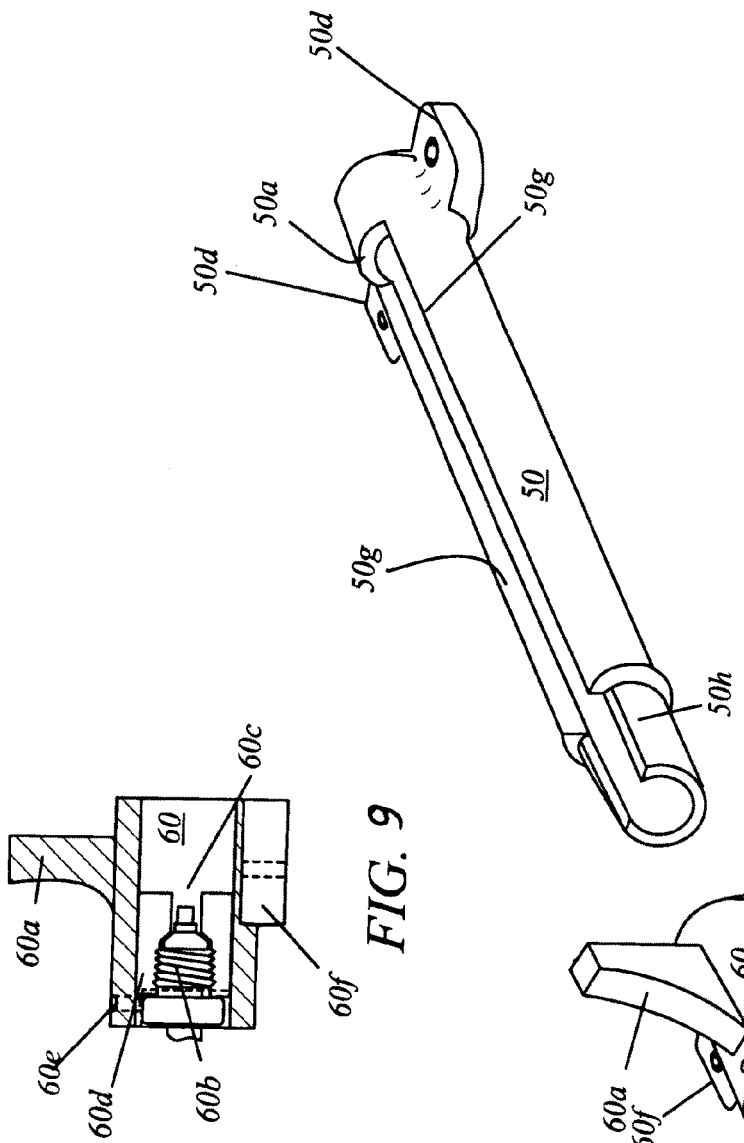
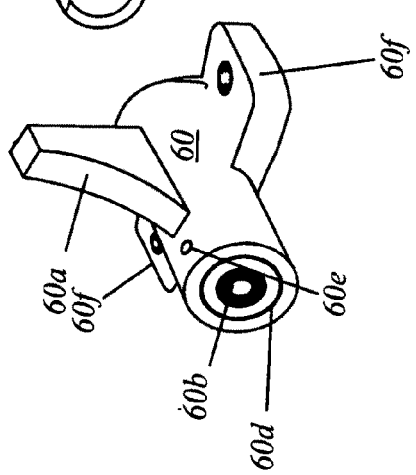
FIG. 8
FIG. 9

HINGE APPARATUS WITH AN ACTUATABLE ASSEMBLY

STATEMENT OF GOVERNMENT INTEREST

The invention described herein may be manufactured and used by or for the Government of the United States of America for Governmental purposes without the payment of any royalties thereon or therefore.

FIELD OF THE INVENTION

The invention relates generally to frangible hinges, and more particularly to an actuatable assembly and method for decoupling robust aircraft hinges.

BACKGROUND OF THE INVENTION

The performance and survivability of personnel in an aircraft, such as a helicopter, is a major design consideration. While protection of the pilots and other crew members is of primary importance, consideration must also be given to other personnel (e.g., assault troops and litter patients) and mechanical components (e.g., fuel cells) whose survival contributes to successful mission performance. Personnel are susceptible to all direct and secondary injury mechanisms (e.g., span fragments and other debris) emanating from threat weapon effects, as well as from other causes including explosive removal of doors/canopies and ejection seat rockets. The separation of doors/canopies and ejection seats is particularly dangerous as separation utilizes explosives in very close proximity to the crew and other personnel on the aircraft. The separation explosive can produce explosive decompression, sound pressure and impulse, toxic fumes, and smoke, all of which can have an adverse impact on the survivability of the crew and others.

Survivability and effectiveness is of special concern in the case of helicopters such as the AH-1W and AH-1Z USMC helicopters, where a combination of factors aggravates the situation. The crew is located very close to the airframe and the helicopters have been outfitted to have improved ballistic resistance. To effect separation of the doors/canopies and fixed windows requires greater explosive force, and coincident greater trauma to those onboard when these emergency egress systems are actuated.

SUMMARY OF THE INVENTION

In a variation of the invention, the invention is a hinge apparatus that has automated decoupling. The hinge apparatus is normally coupled, very robust, and suitable for the hanging of a door/canopy and the like. A mounted hinge apparatus is normally only decoupled in the case where rapid egress is necessary, and complete removal of the door/canopy is desired, such as when there is an emergency. The hinge apparatus includes a first hinge member having a first connecting apparatus and an actuatable assembly, and a second hinge member having a second connecting apparatus, where the second connecting apparatus is coupled to the first connecting apparatus. An example of the first connecting apparatus includes a hinge finger and a finger pin. An example of the second connecting apparatus includes a reciprocal hinge finger and a hinge gudgeon, where the pin normally intersects and freely pivots with respect to the gudgeon, such as when the door/canopy is opened or closed. The actuatable assembly is substantially only actuated when rapid egress is necessary. In those circumstances a shielded mild detonating cord (SMDC) tip device or a similar device is ignited producing high pressure gases in a combustion chamber of the actuatable assembly. The high pressure gases actuate a piston that decouples the hinge. Decoupling is effected when the piston shifts linearly. The linear shift causes the first connecting apparatus, which is connected to the piston, to move to a position where the first connecting apparatus is no longer coupled to the second connecting apparatus. The door/canopy at this time falls away, or is furthermore thrust away.

There are several aspects of the invention that make it particularly well suited for USMC helicopters such as the AH-1W and AH-1Z. A first aspect is that the high pressure gases are largely confined in the combustion chamber, thereby reducing toxic fumes and smoke.

A second aspect is that translational movement of the piston is dampened by a compression chamber locate in the actuatable assembly. The dampening reduces the sound pressure and impulse.

A third aspect is that the piston itself does not come into contact with of an elongate slotted barrel-like housing, which houses the piston. The piston is fitted with o-rings, which act as spacers, so that only the edges of the o-rings come into contact with the surface of the barrel-like housing. The edge has a narrow area of contact, and this configuration reduces the frictional resistance, and the spacing provides for greater tolerances, which makes binding improbable. Cumulatively, the o-rings narrow the range of uncertainty as to exactly how much force will be required to actuate the piston, and therefore the amount of charge can be appropriately lowered. The o-rings also act as a gas seal, retaining the high pressure gases, which improves the efficiency and excludes sand, dust, rain, ice, etc. The piston itself acts as a redundant mechanism even if one or more o-rings fail because the piston may still be actuated as it may still move through the barrel-like housing when the shear pin is sheared.

BRIEF DESCRIPTION OF THE DRAWINGS

The foregoing invention will become readily apparent by referring to the following detailed description and the appended drawings in which:

FIG. 2 is a cross-sectional side view of an exemplary embodiment of the invented hinge apparatus having an actuatable assembly, wherein the first hinge member, which includes a hinge finger and a hinge pin, is coupled to the second hinge member, which includes a reciprocal hinge finger and hinge gudgeon;

FIG. 3 is a cross-sectional side view of the embodiment illustrated in FIG. 2, wherein the actuatable assembly has decoupled the first hinge member from the second hinge member;

FIG. 4 is a cross-sectional side view of another exemplary embodiment of the invented hinge apparatus having an actuatable assembly, wherein the first hinge member includes a reciprocal hinge finger and a hinge gudgeon, and is coupled to the second hinge member that includes a hinge finger and a hinge pin;

FIG. 5 is a cross-sectional side view of the embodiment illustrated in FIG. 4, wherein the actuatable assembly has linearly shifted the reciprocal hinge finger and the hinge gudgeon, therein decoupling the second hinge member from the first hinge member;

FIG. 8 is a perspective view of an exemplary embodiment of the actuatable assembly with the piston removed, therein permitting a better perspective of the elongate slotted barrel-like housing and the capping housing component;

FIG. 9 is a cross-sectional view of the capping housing component illustrated in FIG. 8.

DETAILED DESCRIPTION OF THE INVENTION

Figure 1A:
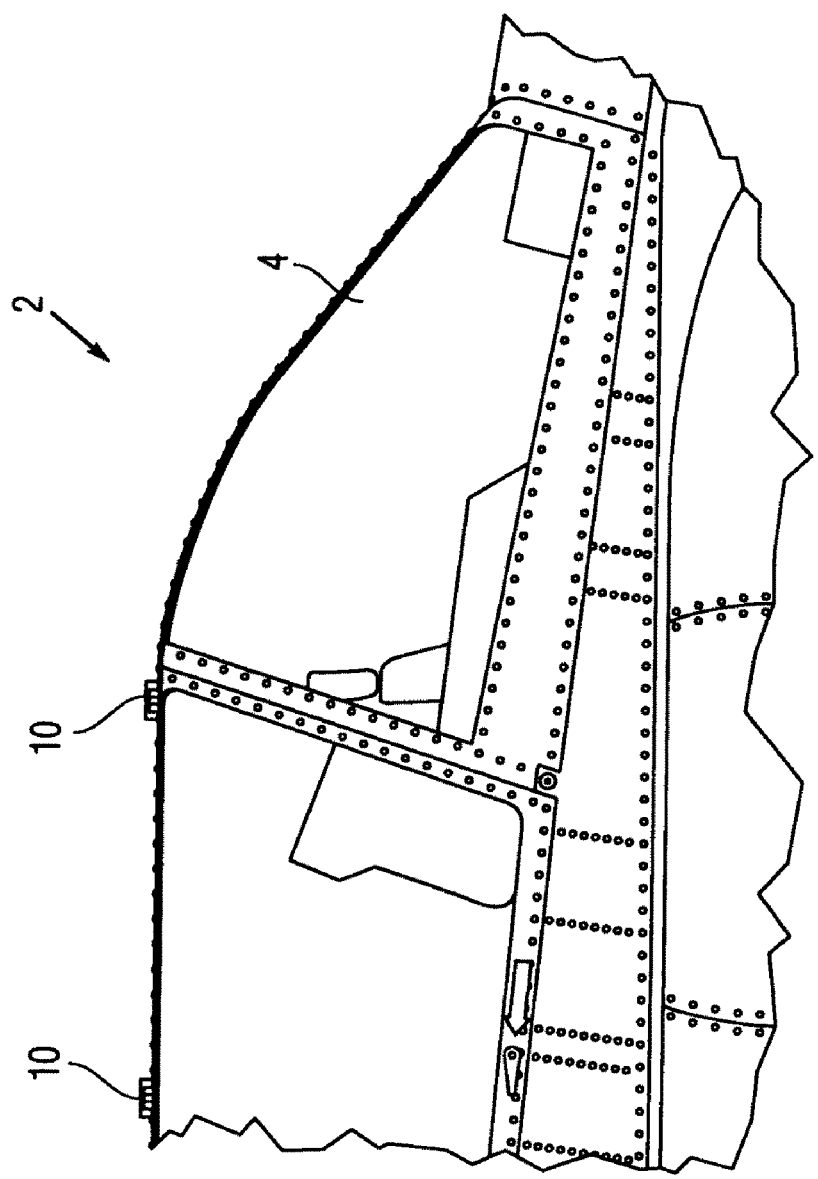
FIG. 1A is a perspective overview view of an exemplary embodiment of the invention from a right side of a helicopter.
Figure 1C:
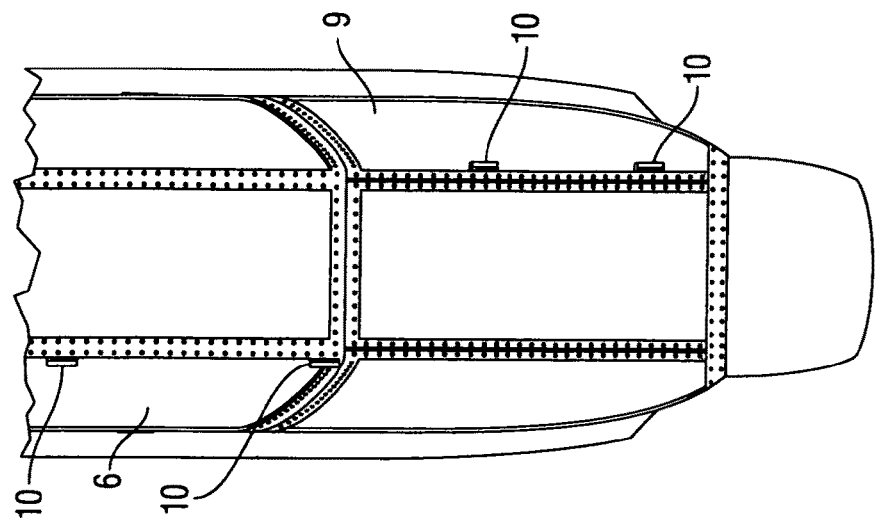
FIG. 1C is a perspective top-down/overview view of an exemplary embodiment of the invention of a helicopter.
Figure 1B:
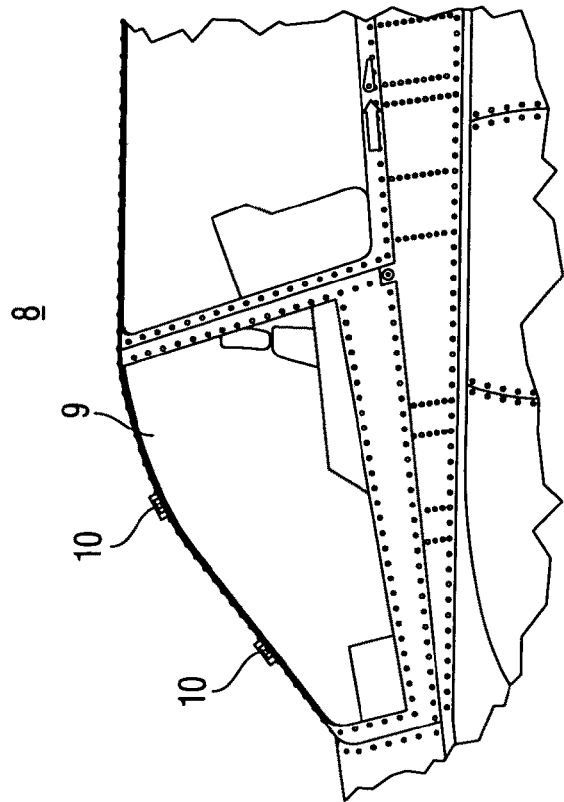
FIG. 1B is a perspective overview view of an exemplary embodiment of the invention from a left side of a helicopter.

Several exemplary embodiments of the invention are shown and described in the attached drawings, where the invention includes a hinge apparatus 10 having automated decoupling. Referring to FIG. 1A and FIG. 1C, the hinge apparatuses 10, 10 may be located on a right side 2 of a helicopter substantially adjacent a rear, right-side window 6, which is behind a front right-side window 4. Similarly, and referring to FIG. 1B, the hinge apparatuses 10, 10 may be located on a left side 8 of a helicopter substantially adjacent a front, left-side window 9. Referring to FIG. 1C, hinge apparatuses 10, 10 may be located substantially adjacent the rear, right-side window 6 as well as located substantially adjacent the front, left-side window 9. Accordingly, the hinge apparatuses 10, 10 on the right side of the helicopter 2 are off-set from the hinge apparatuses 10, 10 on the left side of the helicopter 8 to permit efficient and safe exit from the helicopter 2.

Referring to FIG. 2 the hinge apparatus includes a first hinge member 20 having a first connecting apparatus 22 and an actuatable assembly 40, and a second hinge member 30 with a second connecting apparatus 32. The second hinge member 30 is shown with dashed lines because, as will become apparent, the choice of the first and second hinge members is adjustable, and can be selected from a variety of hinge members. The second connecting apparatus 32 is coupled to the first connecting apparatus 22. In FIG. 2 the first connecting apparatus 22 includes a hinge finger 24 and a hinge pin 26. The hinge finger is depending from a piston 42, which is the actuatable element in the actuatable assembly 40. The second connecting apparatus 32 includes a reciprocal hinge finger 34 and a hinge gudgeon 36. A retainer 60a serves as a backstop in the illustrated embodiment.

Figure 10:
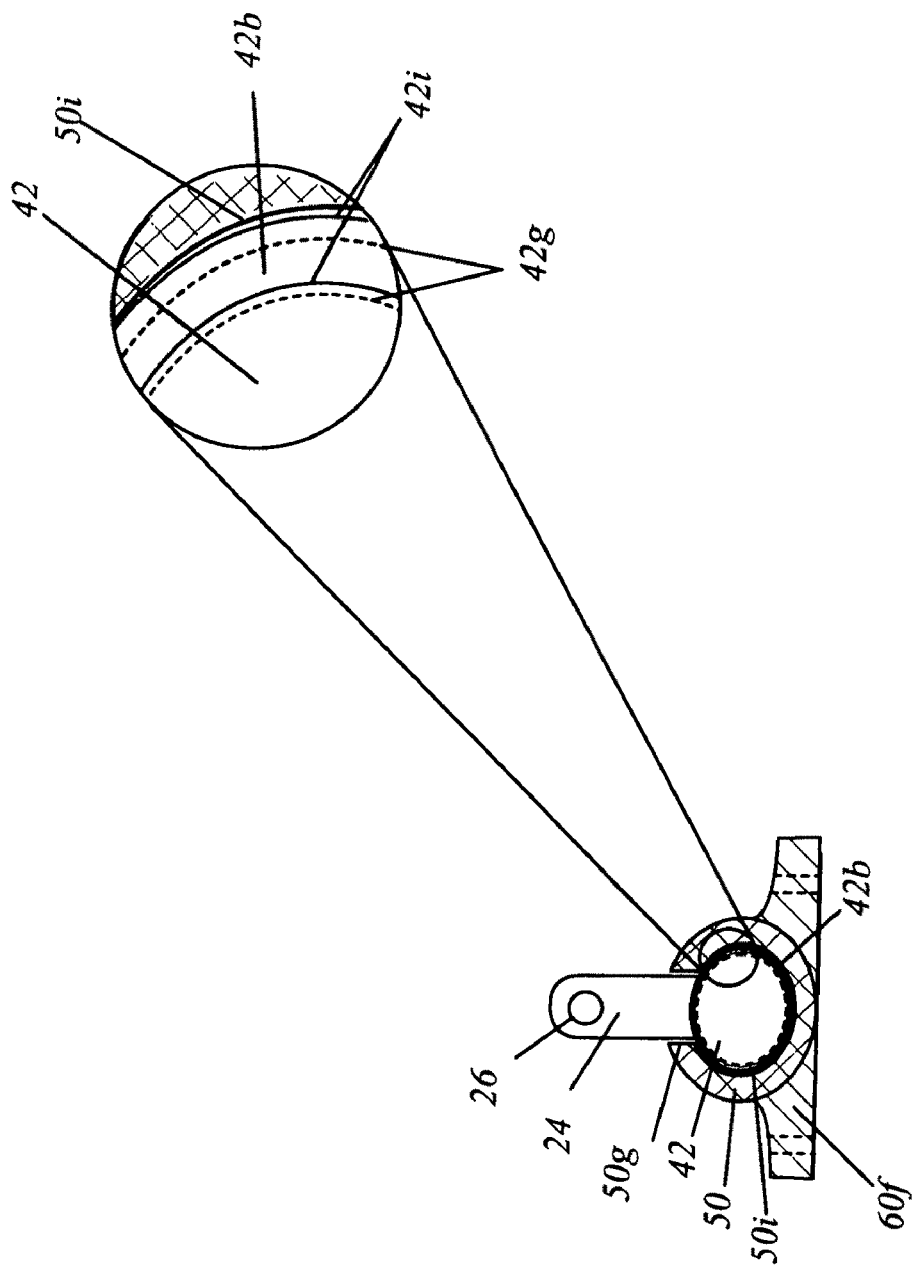
FIG. 10 is a cross-sectional view of the invented hinge apparatus, where the view has an enlarged view that illustrates the use of the o-rings on the piston, where the o-rings serve in-part as spacers, so that only the edges of the o-rings come into contact with the barrel wall of the barrel-like housing, therein reducing the friction resistance, providing for greater tolerances, making binding improbable, and reducing the amount of explosive material required to actuate the piston.

The illustrated piston 42 is rod-like, and it has a first end 42a with a proximate first groove (see 42g in FIG. 6) and a first o-ring 42b with a first edge (not shown) that serves as a spacer. The piston 42 has a medial section 42c, a second groove (see 42h in FIG. 6), and a second o-ring 42d with a second edge (not shown) that serves as another spacer, an opposing end 42e, and a first aperture 42f that is aligned with a second aperture 50f in the elongate slotted barrel-like housing 50. A shear pin 12 is seated in the first and second aperture 42f, 50f; and the pin prevents translational movement by the piston 42. A set screw 14 is used to seat the shear pin 12. The elongate slotted barrel-like housing 50 has a stop 50a, which defines a maximum translational distance that the piston of a specified length can move. This distance is selected such that at the stop or proximate to the stop 50a, the first connecting apparatus 22 is no longer connected to the second connecting apparatus 32. The elongate slotted barrel-like housing 50 has a slot for linear movement of the first connecting apparatus and a barrel-like space for the linear movement of the piston. The slot has a substantially vertical side wall 50g, which prevents rotational movement of the first connecting apparatus 22, as shown in FIG. 2, FIG. 3, and FIG. 10. The first connecting apparatus 22 has a hinge finger 24 depending perpendicular from the piston 42. The slot side wall 50g is sloped at the distal end of the slot forming a ramp 50a. The ramp 50a facilitates the expulsion of debris when the actuatable assembly is actuated The elongate slotted barrel-like housing 50 also has a compression chamber 50b, with a coined burst disk 50c. The coined burst disk 50c is selected to keep out debris, rain, sand, dust, ice; and to deform to relieve pressure as the piston moves toward the stop. The compression chamber 50b functions to dampen the action of the piston, and the burst disk 50c relieves most of the pressure in the compression chamber 50b, where pressure is created in the compression chamber 50b only when the piston is actuated. The elongate slotted barrel-like housing 50 has a first mounting bracket 50d for mounting the housing and the piston contained therein to a door/canopy frame.

The actuatable assembly 40 also includes a capping housing component 60 that provides access for loading the piston 42 into the elongate slotted barrel-like housing. The capping housing component 60 includes a combustion chamber 60c adjacent to the first end 42a of the piston 42. The combustion chamber 60c may hold high pressure gases having sufficient force to move the piston 42 through the barrel-like housing 50, shearing off the shearing pin 12, and compressing air in the compression chamber 50b. When the piston 42 is proximate to or upon reaching the stop, the first hinge member 20 decouples from the second hinge member 30.

The capping housing component 60 includes a threaded port 60d to accept a shielded mild detonating cord (SMDC) tip device 60b. The SMDC tip device on ignition produces high pressure gases 60g in the combustion chamber 60c. A safety wire can be connected to the SMDC tip device via a safety wire port 60c. In one exemplary embodiment, the SMDC tip device utilizes only 65 milligrams of HNS. In another exemplary embodiment, a larger charge device, such as, a type II SMDC tip, may also be employed. The type II SMDC tip uses 144 mgs of HNS. HNS is an abbreviation for hexanitrostilbene, which is listed as a Division 1.1 explosive. A Division 1.1 explosive consists of explosives that have a mass explosion hazard. A mass explosion is one that affects almost the entire load, instantaneously. In the illustrated embodiment, the invention is classified as a safer division 1.4 explosive. Division 1.4 explosives consist of explosives that present a minor explosion hazard. The explosive effects are largely confined to the package and no projection of fragments of appreciable size or range is to be expected. An external fire must not cause virtually instantaneous explosion of almost the entire contents of the package.

It is anticipated that a variety of explosive devices and explosive materials are suitable, because the combustion chamber expands when the piston is actuated, therein keeping the explosion largely confined. For HNS, a range of about or more than 220% by weight to weight of explosive material may be used depending on the characteristics of the shear pin. Other explosive materials may work similarly as the actuator assembly may tolerate a wide performance range. The illustrated capping housing component 60 has a mounting bracket 60f. The retainer 60a, in the illustrated embodiment is a backstop for the hinge pin 26.

Referring to FIG. 3, the invented hinge apparatus 10 having automated decoupling has been actuated. The gases 60g have forced the piston to move to the right, as seen in the page. The shear pin 12 has been sheared off into two portions, a first portion 14a (in the piston) and a second portion 14b (in the housing 50). The coined burst disk 50c has an etched cross shape available to rupture along the etched portions of the etched crosses similar to the opening of a flower petal. Based on this configuration, pressure is relieved without the coined burst disk 50c being blown off. The burst disk 50c is selected so that it is not ejected. If the burst disk 50C is blown off, then it becomes a potentially dangerous fragment. The opposing end 42e of the piston 42 is resting against the stop 50e. There has been no rotational movement of the hinge finger 24, only translational movement. The high pressure gases 60g are temporarily contained in the combustion chamber 60. When decoupled the door/canopy is free to fall away, and furthermore to be thrust away. Rapid egress though the door/canopy frame is possible.

Referring to FIG. 4, which is a cross-sectional side view of an alternate embodiment of the invented hinge apparatus having an actuatable assembly 40. In the alternate embodiment the first connecting apparatus 22 includes the reciprocal hinge finger 34' and hinge gudgeon 36', and the second connecting apparatus 32 includes a hinge finger 24' and a hinge pin 26'. The retainer 60a is a backstop. The first connecting apparatus 22, and the second connecting apparatus 32 are coupled similar to the embodiment in FIG. 1, except that the reciprocal hinge finger 34' is attached to the piston 42. FIG. 3 illustrates that a number of hinged combinations will work with the invented actuatable assembly 40.

Referring to FIG. 5 the actuatable assembly has linearly shifted the reciprocal hinge finger and the hinge gudgeon, therein decoupling the first hinge member from the second hinge member.

Figure 6:
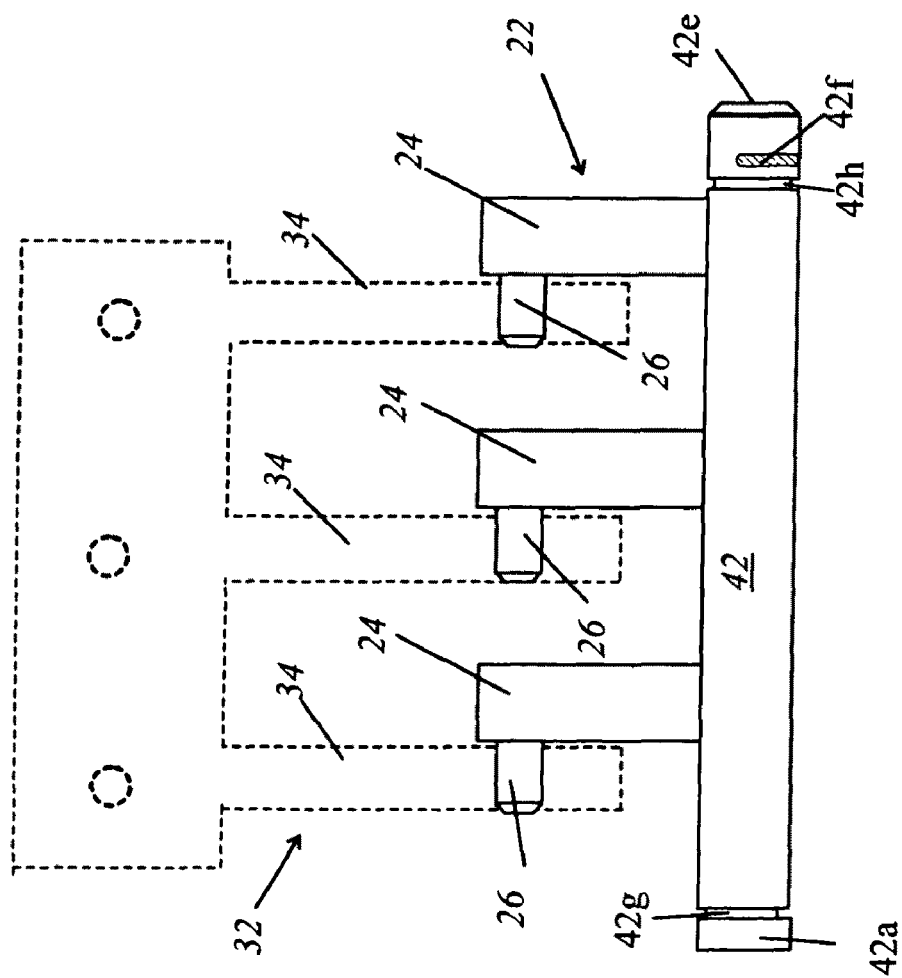
FIG. 6 is a diagrammatic side view of another exemplary embodiment of the hinge apparatus where the piston has a plurality of hinge fingers and hinge pins which are coupled to a plurality of reciprocal hinge fingers and hinge gudgeons.

Referring to FIG. 6, which is a diagrammatic side view of another alternate embodiment of the hinge apparatus, where the piston 42 has a first connecting apparatus 22 with a plurality of hinge fingers 24 and hinge pins 26, which are coupled to the second connecting apparatus 32 with a plurality of reciprocal hinge fingers 34 and hinge gudgeons 36. The action of decoupling is the same as previously described. This hinge assembly is much stronger than a single pin and gudgeon, and is self supporting when a door/canopy is connected to the hinge apparatus. Also shown in FIG. 6 are the first groove 42g and the second groove 42h for the respective o-rings 42b,42c which have been previously illustrated. The groove undercuts the surface of the piston, but the o-rings are large enough that only the outer edge of an o-ring comes into contact with the barrel wall 50i, as shown in FIG. 10.

Figure 7:
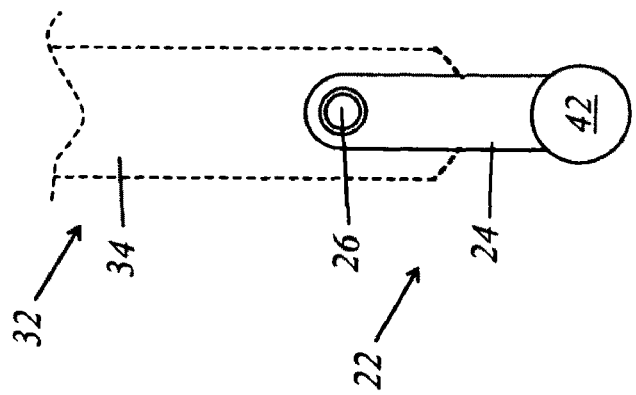
FIG. 7 is an end-on view of the variation illustrated in FIG. 6.

FIG. 7 is an end-on view of the embodiment illustrated in FIG. 6.

Referring to FIG. 8, it is a perspective view of the actuatable assembly with the piston removed. The elongate slotted barrel-like housing 50 has an extension 50h, to facilitate joining the barrel-like housing 50 with the capping housing component 60. The extension 50h is a projected tapered continuation of the barrel wall (see 50i in FIG. 10). FIG. 8 also illustrates the mounting brackets 50d and 60f. A distal end of the slot wall is sloped forming a ramp 50a.

FIG. 9 is another cross-sectional view of the capping housing component 60 illustrated in FIG. 8. The exemplary SMDC tip device 60 utilizes milligram quantities of hexanitrostilbene.

FIG. 10 is a cross-sectional view of the invented hinge apparatus. The enlarged view illustrates the use of the previously described o-rings 42b,42d. The o-rings serve in-part as spacers, so that only the edges of the o-rings come into contact with the barrel wall 50i of the barrel-like housing. Frictional resistance is reduced. The spacing widens machining tolerances, making the actuatable assembly easier to manufacture. The spacing also makes binding between the barrel wall 50i and the piston highly improbable. The lowered frictional resistance and narrowed range of frictional resistance taken together enable the amount of explosive material to be reduced, as the invention eliminates most problematic areas. A lower amount of explosive material reduces the noise and impulse pressure, and the invented apparatus is easier on the crew. The illustrated actuator assembly in this view is slightly elliptical, and has an increased resistance to rotational movement.

The invention also is a method for rapidly removing a door/canopy of a helicopter. The steps include providing an automated decoupling door hinge apparatus having a first hinge member with a hinge finger, a hinge pin, and an actuatable assembly, where the first hinge member is mounted to a frame for the door/canopy; and a second hinge member with a reciprocal hinge finger, and a hinge gudgeon that is coupled to the hinge pin. The second hinge member is mounted to the door/canopy. The actuatable assembly includes a shear pin, an actuatable rod-like piston connected to the hinge finger. The piston has a first end with a proximate first groove and a first o-ring with first edge, a medial section, a second groove and a second o-ring with a second edge, an opposing end, and a first aperture that receives a first portion of the shear pin. There is an elongate slotted barrel-like housing with a stop. The housing has a slot for the linear movement of the hinge finger and a barrel-like space for the linear movement of the piston. The stop defines a maximum translational distance that the piston may move. There is a second aperture that receives a second portion of the shear pin, and a first mounting bracket that is affixed to the door/canopy frame for mounting the slotted barrel-like housing. There is a capping housing component that provides access for loading the piston into the elongate slotted barrel-like housing, where the capping housing component is comprised of a combustion chamber adjacent to the first end of the piston, a threaded port and a shielded mild detonating cord (SMDC) tip device. The SMDC tip device may produce high pressure gases having sufficient force to move the piston, shearing off the shearing pin, and upon becoming proximate to the stop, decoupling the first hinge member from the second hinge member. The first o-ring and second o-ring limit contact between the piston and the slotted barrel-like housing and the capping housing component, therein establishing a limited frictional resistance, and preventing binding of the piston itself with the slotted barrel-like housing or the capping housing component. The automated decoupling door hinge apparatus is used as a conventional hinge to rotate a door/canopy open and closed; and activating the SMDC tip device actuates the piston, decoupling the hinge apparatus, causing the door/canopy to fall away, and furthermore to be thrust away, and allowing rapid egress though the door/canopy frame.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding It is to be understood that the foregoing description and specific embodiments are merely illustrative of the best mode of the invention and the principles thereof, and that various modifications and additions may be made to the invention by those skilled in the art, without departing from the spirit and scope of this invention, which is therefore understood to be limited only by the scope of the appended claims.

What is claimed is:

1. A hinge apparatus having automated decoupling, comprising:
   a first hinge member comprising a first connecting apparatus and an actuatable assembly; and
   a second hinge member comprising a second connecting apparatus, which is coupled to the first connecting apparatus;
      wherein said actuatable assembly comprises a shear pin,
         an actuatable rod-like piston connected to the first connecting apparatus, said piston comprises a first end with a proximate first groove and a first o-ring with a first edge, a medial section, a second groove and a second o-ring with a second edge, an opposing end, and a first aperture that receives a first portion of the shear pin,
         an elongate slotted barrel-like housing with a stop, said housing provides a slot for linear movement of the first connecting apparatus and a barrel-like space for linear movement of the piston, where said stop defines a maximum translational distance that the piston of a specified length moves, a compression chamber adjacent to the opposing end of the piston, a second aperture that receives a second portion of the shear pin, and a first mounting bracket for mounting said elongate slotted barrel-like housing and the piston contained therein to a door/canopy frame, and
         a capping housing component that provides access to load loading the piston into the elongate slotted barrel-like housing, where said capping housing component is comprised of a combustion chamber adjacent to the first end of the piston, where said combustion chamber holds high pressure gases with sufficient force to move, linearly, the piston, which shears off the shearing pin, compresses air in the compression chamber and upon coming into the proximity of the stop, decouples the first hinge member from the second hinge member, and
      wherein the first edge of the first o-ring and the second edge of the second o-ring limit contact between the actuatable rod-like piston and the slotted barrel-like housing and the capping housing component, therein has a limited frictional resistance, and prevents binding of the piston itself with at least one of the slotted barrel-like housing and the capping housing component.

2. The apparatus according to claim 1, wherein said capping housing component further comprises a threaded port and a shielded mild detonating cord (SMDC) tip device, and wherein said SMDC tip device on ignition produces high pressure gases in the combustion chamber.

3. The apparatus according to claim 2, wherein said SMDC tip device utilizes an explosive.

4. The apparatus according to claim 2, wherein said SMDC tip device utilizes an explosive, and wherein said actuatable assembly largely confines an explosion so that no projection of fragments of one of appreciable size and range is expected, such that the explosive is safer, such that the explosive in bulk powder form has a Division 1.1 classification, but when loaded in the SMDC tip device it has a Division 1.4 classification.

5. The apparatus according to claim 2, wherein said SMDC tip device utilizes an explosive, and wherein said explosive is hexanitrostilbene and the like.

6. The apparatus according to claim 1, wherein said first connecting apparatus comprises a hinge finger and a hinge pin.

7. The apparatus according to claim 6, wherein said capping housing component further comprises a retainer that is a backstop for a hinge pin.

8. The apparatus according to claim 6, wherein said capping housing component further comprises a retainer that is a backstop for a hinge pin, and wherein said second connecting apparatus comprises a reciprocal hinge finger and a hinge gudgeon.

9. The apparatus according to claim 1, wherein said capping housing component further comprises a second mounting bracket for mounting said capping housing component to the door/canopy frame.

10. The apparatus according to claim 1, wherein said apparatus has a connecting component for joining the elongate slotted barrel-like housing and the capping housing component.

11. The apparatus according to claim 2, wherein said SMDC tip device has a safety wire.

12. The apparatus according to claim 1, wherein the slot of the elongate slotted barrel-like housing has a perimeter wall that is substantially vertical, therein providing rotational restraint for the first connecting apparatus depending from the piston.

13. The apparatus according to claim 1, wherein the first connecting apparatus is comprised of a plurality of hinge fingers and a hinge pins, and wherein the second connecting apparatus is comprised of a number of matching reciprocal hinge fingers and hinge gudgeons.

14. The apparatus according to claim 13, wherein the number is three.

15. The apparatus according to claim 1, wherein said compression chamber of the elongate slotted barrel-like housing further comprises a coined burst disk with etched crosses, which opens like a flower petal, and wherein said coined burst disk provides pressure relief and dampens the linear movement of the piston when the piston is actuated.

16. The apparatus according to claim 12, wherein said perimeter wall comprise a sloped end portion of an otherwise substantially vertical perimeter wall, wherein said sloped end portion is proximate to an opposite end of the piston, and wherein said sloped end portion is a ramp to expel debris.

17. The apparatus according to claim 1, further comprising a set screw, wherein said set screw seats the shear pin in the second aperture and the first aperture.

18. An actuatable assembly, comprising:
   a shear pin;
   an actuatable rod-like piston, said piston comprises a first end with a proximate first groove and a first o-ring with a first edge, a medial section, a second groove and a second o-ring with a second edge, an opposing end, and a first aperture that receives a first portion of the shear pin;
   an elongate slotted barrel-like housing with a stop, said housing provides a barrel-like space for linear movement of the piston, where said stop defines a maximum translational distance that the piston of a specified length moves, a compression chamber adjacent to the opposing end of the piston, a second aperture that is aligned with the first aperture where, prior to actuation, the piston is positioned, where said second aperture receives a second portion of the shear pin, and a first mounting bracket for mounting said elongate slotted barrel-like housing and the piston contained therein to a door/canopy frame; and a capping housing component providing access for loading the piston into the elongate slotted barrel-like housing and a capping extension of the housing, where said capping housing component is comprised of a combustion chamber adjacent to the first end of the piston, where said combustion chamber holds high pressure gases with sufficient force to move, linearly, the piston, which shears off the shearing pin until the piston is proximate to the stop, and wherein the first edge of the first o-ring and the second edge of the second o-ring limit contact between the actuatable rod-like piston and the slotted barrel-like housing and the capping housing component, therein establishing a limited frictional resistance, and preventing binding of the piston itself with the slotted barrel-like housing or the capping housing component.

19. The apparatus according to claim 18, wherein said capping housing component further comprises a threaded port and a shielded mild detonating cord (SMDC) tip device, and wherein said SMDC tip device on ignition produces high pressure gases in the combustion chamber.

20. A method for rapidly removing a helicopter door/canopy, comprising:

providing an automated decoupling door/canopy hinge apparatus,
wherein said hinge apparatus is comprised of a first hinge member and a second hinge member,
wherein the first hinge member comprises a hinge finger, a hinge pin, and an actuatable assembly,
wherein said first hinge member is mounted to a door/canopy frame,
wherein said second hinge member comprises a reciprocal hinge finger, a hinge gudgeon that is coupled to the hinge pin,
wherein said second hinge member is mounted to the door/canopy,
wherein said actuatable assembly comprises a shear pin, an actuatable rod-like piston connected to the hinge finger, said piston having a first end with a proximate first groove and a first o-ring with a first edge, a medial section, a second groove and a second o-ring with a second edge, an opposing end, and a first aperture that receives a first portion of the shear pin,
an elongate slotted barrel-like housing with a stop, said housing provides a slot for linear movement of the hinge finger and a barrel-like space for linear movement of the piston, where said stop defines a maximum translational distance that the piston can move, a second aperture that receives a second portion of the shear pin, and a first mounting bracket, and
a capping housing component provides access to load the piston into the elongate slotted barrel-like housing and a capping extension of the housing, where said capping housing component is comprised of a combustion chamber adjacent to the first end of the piston, a threaded port and a shielded mild detonating cord (SMDC) tip device, where said SMDC tip device can produce high pressure gases having sufficient force to move the piston, shearing off the shearing pin, and upon reaching the stop, decoupling the first hinge member from the second hinge member, and
wherein the first o-ring edge and second o-ring edge limit contact between the piston and the slotted barrel-like housing and the capping housing component, therein establishing a limited frictional resistance, and preventing binding of the piston itself with the slotted barrel-like housing or the capping housing component;
using the automated decoupling door hinge apparatus as a conventional hinge for rotating a door open and closed; and
activating the SMDC tip device for actuating the piston, therein decoupling the hinge apparatus, causing the door to fall away, and furthermore for thrusting away, and allowing rapid egress though the door frame.

* * * * *